United States Patent
Lang et al.

(10) Patent No.: US 10,275,914 B2
(45) Date of Patent: Apr. 30, 2019

(54) DISPLAY SYSTEM FOR A VEHICLE, IN PARTICULAR COMMERCIAL VEHICLE

(71) Applicants: Werner Lang, Ergersheim (DE); Peter Geissendörfer, Gallmersgarten (DE)

(72) Inventors: Werner Lang, Ergersheim (DE); Peter Geissendörfer, Gallmersgarten (DE)

(73) Assignee: MEKRA LANG GMBH & CO. KG, Ergersheim (DE)

( * ) Notice: Subject to any disclaimer, the term of this patent is extended or adjusted under 35 U.S.C. 154(b) by 0 days.

(21) Appl. No.: 15/061,436

(22) Filed: Mar. 4, 2016

(65) Prior Publication Data

US 2016/0260238 A1 Sep. 8, 2016

(30) Foreign Application Priority Data

Mar. 6, 2015 (DE) .................. 10 2015 002 923

(51) Int. Cl.
*G09G 5/00* (2006.01)
*G06T 11/60* (2006.01)
(Continued)

(52) U.S. Cl.
CPC ............. *G06T 11/60* (2013.01); *B60R 1/00* (2013.01); *G09G 3/20* (2013.01); *H04N 7/183* (2013.01);
(Continued)

(58) Field of Classification Search
CPC ....... G06T 19/00; G06T 19/006; G06T 17/00; H04N 5/272; A63F 13/10
(Continued)

(56) References Cited

U.S. PATENT DOCUMENTS

2001/0028393 A1 10/2001 Takayuki et al.
2005/0174429 A1* 8/2005 Yanai ..................... B60R 1/00
348/148
(Continued)

FOREIGN PATENT DOCUMENTS

EP 1 897 751 3/2008
EP 2 544 162 1/2013
(Continued)

OTHER PUBLICATIONS

Search Report dated Aug. 16, 2016 which issued in the corresponding European Patent Application No. 16155508.1.
(Continued)

*Primary Examiner* — Gordon G Liu
(74) *Attorney, Agent, or Firm* — Cozen O'Connor

(57) ABSTRACT

A display system for a commercial vehicle, having a capturing unit for acquiring image data of the vehicle environment, a calculation unit and a display unit for displaying an image to be displayed with an image portion. The calculation unit is adapted to carry out a modification of the image data acquired by the capturing unit and to supply the modified image data to the display unit for display. The modification uses overlaying or superimposing of an overlay portion on the image portion of the image to be displayed, wherein the overlay portion is positioned within or directly adjacent to the image portion, and wherein the image portion further includes a measuring portion. An image characteristic of the image portion is acquired in the measuring portion. The calculation unit is adapted to determine an overlay portion characteristic dependent on the acquired image characteristic.

17 Claims, 3 Drawing Sheets

(51) Int. Cl.
*H04N 7/18* (2006.01)
*B60R 1/00* (2006.01)
*G09G 3/20* (2006.01)

(52) U.S. Cl.
CPC .. *B60R 2300/305* (2013.01); *G09G 2320/066* (2013.01); *G09G 2320/0626* (2013.01); *G09G 2320/0666* (2013.01); *G09G 2360/144* (2013.01)

(58) Field of Classification Search
USPC ........................................................ 345/643
See application file for complete search history.

(56) References Cited

U.S. PATENT DOCUMENTS

| 2009/0097708 | A1* | 4/2009 | Mizuta | G06T 11/00 |
| | | | | 382/103 |
| 2009/0102858 | A1 | 4/2009 | Eggers et al. | |
| 2011/0122109 | A1 | 5/2011 | Nose | |
| 2013/0176329 | A1 | 7/2013 | Toyoda et al. | |
| 2013/0307985 | A1 | 11/2013 | Numata et al. | |
| 2014/0093127 | A1* | 4/2014 | Mundhenk | G06K 9/00744 |
| | | | | 382/103 |
| 2015/0062141 | A1 | 3/2015 | Hayasaka | |
| 2016/0288717 | A1* | 10/2016 | Kameshima | G06T 7/73 |

FOREIGN PATENT DOCUMENTS

| JP | 2001-239882 | 9/2001 |
| JP | 2004-173071 | 6/2004 |
| JP | 2007-043607 | 2/2007 |
| JP | 2007-060040 | 3/2007 |
| JP | 2008-022348 | 1/2008 |
| JP | 2010-215059 | 9/2010 |
| JP | 2010-273209 | 12/2010 |
| JP | 2011-112727 | 6/2011 |
| WO | WO 2014/156788 | 10/2014 |

OTHER PUBLICATIONS

Office Action dated Apr. 4, 2017 which issued in the corresponding Japanese Patent Application No. 2016-029510.

* cited by examiner

DISPLAY SYSTEM FOR A VEHICLE, IN PARTICULAR COMMERCIAL VEHICLE

BACKGROUND OF THE INVENTION

1. Field of the Invention

The invention relates to a display system for a vehicle, in particular commercial vehicle, by means of which display system images of the vehicle environment can be displayed in a vehicle interior, e.g. in a driver's cabin of a commercial vehicle, so that they are visible to the driver. Such display systems which are, inter alia, used as mirror replacement systems or, additionally to the exterior mirrors of a vehicle, serve for displaying the situation in the vehicle environment in specific driving situations, or permanently, and as ergonomically as possible to the driver, thus contributing to an increased traffic safety by providing the driver of the vehicle with a good overview of the traffic situation around the vehicle and of possible dangers.

2. Description of the Related Art

Mirror replacement systems and other camera-monitor-systems and display systems, respectively, for vehicles are known in the prior art. These systems usually comprise a capturing unit, e.g. a camera, by means of which at least a field of view around the vehicle can be captured and image data of the field of view can be acquired, a calculation unit which processes the image data and provides the same for display on a display unit like, for example, a monitor, or for projection on structural parts of the vehicle. The captured fields of view around the vehicle may also include legally prescribed fields of vision, which, for Europe, are prescribed by ECE regulation R 46.

It is, inter alia, known to use monitors with so-called split screen view where a plurality of images, which images are often different and possibly captured by different capturing units, are shown on the same monitor on different monitor portions. Here, the individual image portions are separated by separating lines or separating portions which may be monochromatic or varicolored and usually have a width of one to several pixels.

In other systems, which are inter alia used for so-called driver assistance systems, it is also known to superimpose warning frames on the image portions in case the calculation unit recognizes an obstacle or hazard area in the captured image by analysing the image. Thus, it can be warned of a possible hazard by highlighting said hazard by means of the warning frame. It is further known to also overlay other graphics, e.g. partially transparent graphics.

In the known prior art display systems, it is further possible to modify the display, e.g. in which size an image of a certain capturing unit is displayed on a display unit, dependent on external signals, e.g. the steering angle or the driving condition of the vehicle, e.g. forward driving or reversing. When acquiring a steering angle that does not correspond to straight forward driving, for example, it is known to display the side area next to the vehicle in an enlarged or otherwise highlighted manner.

Although, in the known display systems, overlaying or superimposing of separating lines or warning frames and graphics, respectively, may possibly be effected dependent on the driving situation, it is not effected dependent on the image characteristics of the image to be displayed, which is directly adjacent to the separating line or frame and graphic, respectively. Consequently, when the characteristics of the image content directly adjacent to the separating line or superimposition substantially correspond to the characteristics of the separating line or superimposition, the latter may no longer be recognized by the driver. If, for example, black separating lines are used in images captured at night, it is hard to distinguish between image and separating line.

US 2013/0307985 A1 refers to a vehicle driving assist device which can clearly display super-imposing guidelines on an image captured from the surrounding area of a vehicle. The modified image is displayed on a display unit. For this purpose, a color attribute detection means detects a hue or the brightness of the captured image area on which a guideline is superimposed. Dependent on the detection, a color combination pattern setting means or a brightness setting means sets a color combination or brightness, respectively, of the overlayed guidelines and compares contrast or brightness of the captured image area to hue or brightness of the guideline and, if these are similar or identical, sets a changed color combination pattern for the guide-lines at least in parts of the image, in which hues or brightness are identical or approximate.

US 2013/0176329 A1 refers to a surrounding image display system, in which an image captured by a camera is processed by a processing unit and a frame border is overlayed to the image. The frame border includes a frame border portion drawn in a first color and a second frame border portion drawn in a second color different from the first color.

JP 200123988 A2 refers to a vehicular circumference viewing device wherein a partitioning line between two displayed images consists of black and light blue.

SUMMARY OF THE INVENTION

Based thereon, it is an object of the invention to provide a display system for a vehicle, in particular commercial vehicle, by means of which display system different image portions may be displayed clearly separate from each other, or by means of which superimpositions in the image portion are clearly recognizable, independent of the image characteristics of the image portion.

An embodiment of the invention is based on the idea to adapt and modify the characteristics of an overlay portion, which may be, for example, a separating line between a plurality of image portions, a frame around an image portion, or an superimposition portion in the image portion, dependent on the currently captured image portion and its current characteristics, and dependent on the characteristics of the image portions directly adjacent to the overlay portion, respectively, and to correspondingly determine/set the characteristics of the overlay portion(s).

Here, the term "characteristics of the overlay portion" is intended to comprise all graphical characteristics the overlay or superimposition may have. For example, the color shade, brightness, contrast, saturation, transparency, or any combination of these characteristics, of the separating line and frame, respectively, or of any other overlay portion may be modified.

It is thus intended to provide a measuring portion in the image portion to be displayed, which may be chosen by a calculation unit dependent on the driving situation or driving parameters, respectively, or which may be a set/determined image portion independent of the driving situation and vehicle driving parameters, in which measuring portion the characteristics of the image portion are acquired, e.g. by image analysis with regard to the graphical characteristics. The characteristics acquired in the image portion may be any graphical characteristic as, for example, color shade, brightness, contrast, saturation, transparency or any combination thereof. Preferably, the measuring portion is directly adjacent to the intended overlay portion as this ensures that the measurement in the image portion is carried out at positions which are relevant for recognizing the transition between overlay portion and image portion, so that a clear contrast is provided between the overlay portion and the adjacent image portion.

Thus, for example in the dark, when the image portion is basically darker than in daylight, e.g. the previously darker separating lines may be displayed brighter than in daylight, for example, so that, on the one hand, good recognisability of the separating lines and, consequently, of the different image portions, is ensured and, on the other hand, it is ensured that the driver is not unnecessarily blinded. At the same time, it is easy for the driver to recognize whether the display system and, in particular, the display unit is functioning, because at least the overlay portion is always recognizable independent of an image which may appear black.

With regard to the adaption and determination of the characteristics of the overlay portion with regard to those of the image portion, it is preferred to have a clear allocation of one or several image characteristics to one or several overlay portion characteristics. For example, an image characteristic may be acquired in the image portion (e.g. brightness) and one or several overlay portion characteristics (e.g. brightness or saturation) may be adjusted dependent thereon. Alter-natively, a plurality of image characteristics may be acquired and, dependent thereon, overlay portion characteristics may be determined by a one to one allocation or by allocating a plurality of image characteristics to one overlay portion characteristic.

Here, it is preferable that the characteristic of the at least one image portion is mapped to the characteristic of the at least one overlay portion by means of a mathematical function. For ex-ample, a linear or non-linear function may be used.

In case of a plurality of image portions, the mathematical function for an overlay portion between these image portions may be either chosen dependent on a dominating image portion of the two image portions, or dependent on both image portions, e.g. by averaging or the like. This always allows for good recognisability and distinction between image portion and overlay portion, even in case of a plurality of image portions.

Further, in case a plurality of overlay portions are provided, the characteristic determination for the overlay portion may be carried out separately for each overlay portion, or it may be carried out by a common allocation by means of averaging or based on a multidimensional mathematical function.

Further, the change of the characteristics of the overlay portion is carried out time-delayed, and only if a certain characteristic of the image portion is present for a certain period of time, respectively. Thereby, it can be avoided that a momentary, temporarily change of the image portion characteristic, e.g. a momentary obscuration, causes rapid changes of the overlay portion characteristics, which in turn may confuse the driver.

More preferably, the display system is used in conjunction with a plurality of image portions. Here, the overlay portion separates the different image portions, e.g. by a horizontal and/or vertical overlay portion.

Additionally or alternatively, the overlay portion may include a superimposition, e.g. for warning the driver of an obstacle located in one or several image portion(s) and/or a frame around one or several image portion(s) may be provided as overlay portion, if necessary. The superimposition may also be a graphical and/or text overlay of a menu navigation, e.g. of a general on-board computer and/or an external device.

In case a plurality of image portions are provided, the different image portions to be displayed may be preferably modified dependent on a driving situation, which is determined by driving parameters of the vehicle, e.g. in a central on-board computer. Dependent on a driving situation, e.g. an enlargement or reduction of the overlay portion may be carried out and/or overlay portion characteristics like, e.g. color shade, brightness, contrast, saturation and transparency may be modified or adapted to the driving situation, respectively.

The plurality of image portions may, for example, be extracted from the image of a single capturing unit, e.g. a camera, or they may be provided by images of different capturing units. Further, the calculation unit may separate single portions of the captured image data of a respective capturing unit, or it may display the entire capturing portion.

With regard to the calculation unit it has to be noted that it may be integrated in the capturing unit, e.g. the camera, in the display unit, e.g. the monitor, provided as separate calculation unit, or provided in connection with a general on-board computer. Further, it is also possible to use a combination of a plurality of calculation units so that, for example, the capturing portion to be displayed is already selected in the camera, while the choice which of the individual image portions is actually displayed and in which size, as well as the modification of the overlay portion characteristic and the determination thereof is carried out in a central processing unit, e.g. an on-board computer, before the image is displayed on the display unit.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the following, the invention is exemplarily described by means of the attached Figures, wherein.

DETAILED DESCRIPTION OF THE PRESENTLY PREFERRED EMBODIMENTS

Figure 7:
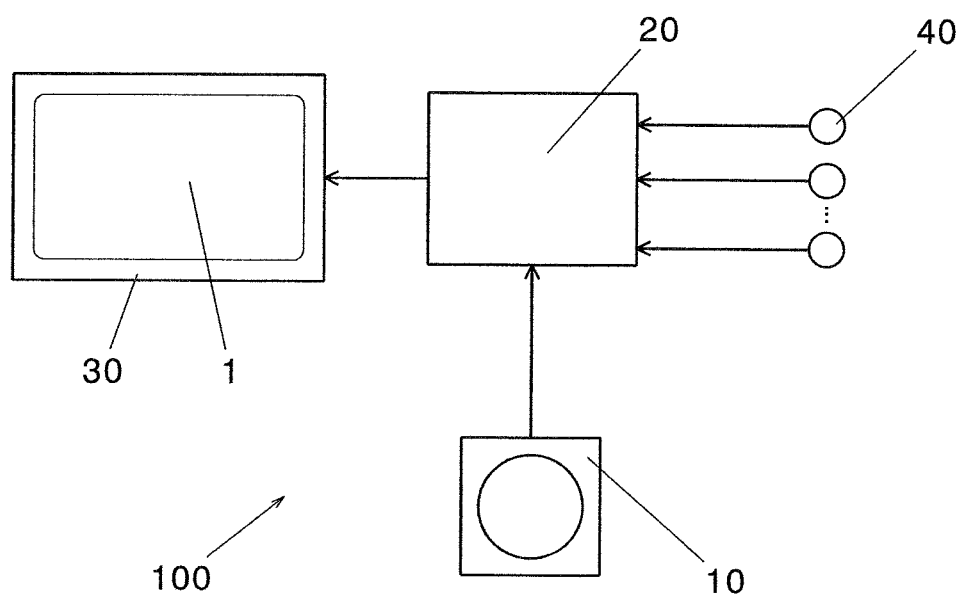
FIG. 7 schematically shows a display system for a vehicle.

FIG. 7 shows an embodiment of a display system 100 for a vehicle. The display system 100 comprises a capturing unit 10, which may be a camera or an image sensor, a calculation unit 20 and a display unit 30. The calculation unit 20 may be integrated in the camera 10, integrated in the display unit 30, or, as illustrated in FIG. 7, may be provided as separate unit 20, for example in connection with an on-board computer comprising a processing unit (ECU). Besides the image data provided by the capturing unit(s) 10, the calculation unit 20 may also be supplied with vehicle driving parameters from different vehicle sensors 40, which acquire characteristics regarding the driving state of the vehicle as, for example, the vehicle speed, the driving direction, a steering angle, the activation of an indicator and the like.

Further, it has to be noted that a plurality of capturing units 10 may be provided around the vehicle, e.g. a capturing unit 10 capturing the side area on a left side of the vehicle, a capturing unit 10 capturing the side area on a right side of the vehicle, a capturing unit for the area ahead of the vehicle, a capturing unit for the area behind the vehicle, etc.

The display unit 30 is provided in the form of a monitor, which is, for example, mounted in the driver's cabin of a commercial vehicle in a position clearly visible for the driver. Alternatively, the display unit 30 could be provided in the form of a projection device on a structural part of the vehicle and also clearly visible for the driver.

Here, overall, the display system 100 may be provided as a mirror replacement system, which means that the mirrors usually provided in and around the vehicle, which mirrors are for monitoring the area around the vehicle and for viewing areas around the vehicle, which areas are not directly visible for the driver, are completely replaced by the camera monitoring system and the display system 100, respectively. In this case, it is essential that the fields of view or the legally prescribed fields of vision, respectively, are permanently displayed, i.e. not temporally interrupted by other displays, and shown in real time. On the other hand, the display system 100 may also be used in addition to conventional mirrors and conventional devices for indirect sight, respectively. In this case, a permanent display is not necessary. Rather, a display may be shown only in case of a specific driving situation.

The image data of the vehicle environment captured by the capturing unit(s) 10 are supplied to the calculation unit 20 for further processing. The calculation unit 20 may determine a driving state of the vehicle, e.g. by means of the data acquired by the vehicle sensors 40 and select the image portions 1, 1a, 1b, 1c, 1d to be generally displayed on the display unit 30 dependent on this driving state. Here, one image portion or a plurality of image portions, which may be connected or separate from each other, may be chosen by the calculation unit 20; e.g. when detecting a turning process, for example, by means of a steering angle sensor serving as a vehicle sensor 40, a portion in the vicinity of the vehicle may be one of the chosen image portions 1, 1a, 1, 1c, 1d. Further, the image portions 1a and 1b shown in FIG. 2, for example, may correspond to the legally prescribed fields of vision II and IV, respectively, of ECE regulation R 46, or to the fields of vision V and VI, respectively, or to any other combination of legally prescribed fields of vision.

Further, the calculation unit 20 is adapted to carry out a modification of the image to be displayed to that effect that an overlay portion 2, 4, 5 (cf. FIGS. 1 to 4) is displayed or superimposed in or directly adjacent to the image portion 1, 1a, 1b, 1c, 1d. In the embodiment illustrated in FIG. 1, the overlay portion 2, which is overlayed in the image portion 1, is a frame around the image portion 1. In the embodiment shown in FIG. 2, the overlay portion 4 is a separating line between two image portions 1a, 1b. In the embodiment shown in FIG. 3, the overlay portion 4 is a combination of two separating lines, a horizontal separating line and a vertical separating line, between a total of four image portions 1a, 1b, 1c, and 1d. Finally, in the embodiment shown in FIG. 4, the overlay portion 5 is a graphical object, here a figural representation, which is superimposed on the image to be displayed in an image portion 1 and serves the driver of the vehicle, e.g. as a warning hint on a person in the vicinity of the vehicle. Combinations of these overlay portions are also possible so that, for example, an overlay portion with a graphical illustration may be used as a warning additionally to a frame constituting overlay portion 2.

At least one characteristic of the overlay portion 2, 4, 5, e.g. color shade, brightness, contrast, saturation or transparency is modified and determined dependent on a corresponding characteristic of a measuring portion 3, 3a, 3b, 3c, 3d within the image portion 1, 1a, 1b, 1c, 1d. Here, the measuring portion 3, 3a, 3b, 3c, 3d is preferably located directly adjacent to the respective overlay portion 2, 4, 5. This results in a particularly good determination of the characteristics of the overlay portion 2, 4, 5, which are required for distinguishing between the overlay portion 2, 4, 5 and image portion 1, 1a, 1b, 1c, 1d, so that the overlay portion 2, 4, 5 is always clearly recognizable and visible without taking on characteristics that may disturb the driver. Areas of the image portions 1, 1a, 1b, 1c, 1d that are located remote from the overlay portion 2, 4, 5 are of less relevance for the determination of the overlay portion characteristic to be adjusted, as these remote areas are not decisive for a distinction between the overlay portion 2, 4, 5 and the image portion 1, 1a, 1b, 1c, 1d.

Figure 2:
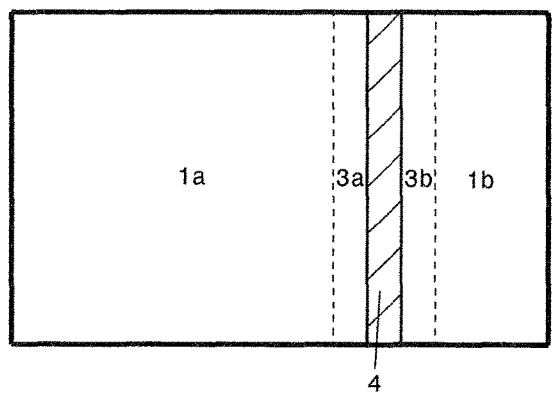
FIG. 2 shows a further embodiment of the display on a display unit of the display system.
Figure 3:
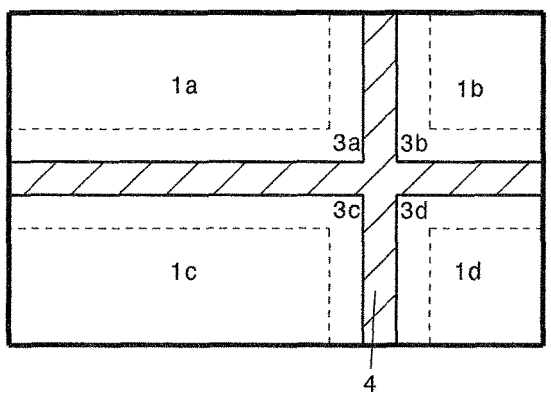
FIG. 3 shows a further embodiment of the display on a display unit of the display system.
Figure 4:
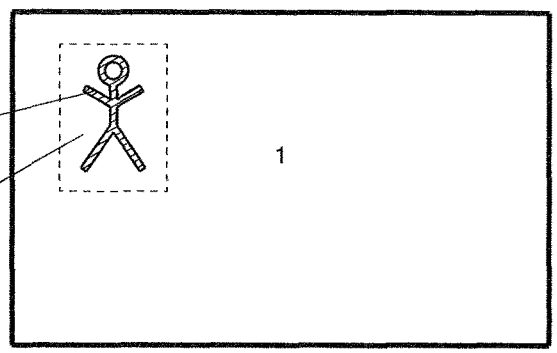
FIG. 4 shows a further embodiment of the display on a display unit of the display system.

The characteristic acquired in the measuring portion 3, 3a, 3b, 3c, 3d by means of the calculation unit 20 may be a characteristic regarding color shade, brightness, contrast, and saturation, or a combination thereof. It is further possible that, in case of a plurality of image portions 1a, 1b, 1c, 1c and a corresponding plurality of measuring portions 3a, 3b, 3c, 3d, as illustrated in FIGS. 2 and 3, the determination of the characteristics of overlay portion 4 may be carried out by optimizing the characteristics measured in the various measuring portions 3a, 3b, 3c, 3c, and correspondingly allocating the overlay portion characteristics.

Figure 1:
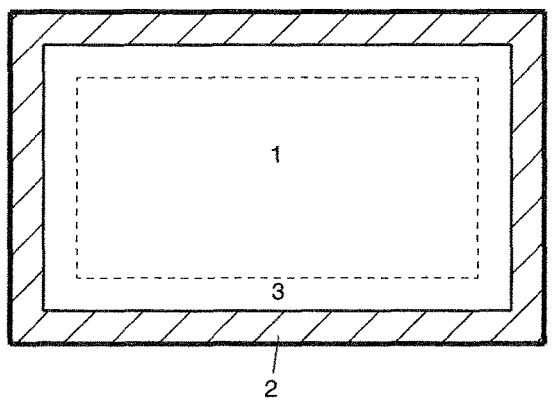
FIG. 1 shows a first embodiment of the display on a display unit of the display system.

Also in the embodiment shown in FIG. 1, where the measuring portion 3 includes a frame that is located further inward with regard to overlay portion 2, it is preferable that the image characteristics of the image portion in the measuring portion are determined at different points, and the overlay portion characteristic is determined by means of averaging and optimization, respectively. Thus, it can be prevented that, for example, a single point, which is coincidentally dark, causes the adaption of the entire overlay portion characteristic 2 to a dark image portion 1.

In any case, it is essential that the overlay portion characteristic is determined dependent on an acquired characteristic of the image portion 1, 1a, 1b, 1c, 1d, i.e. an image characteristic, and not dependent on parameters acquired outside the image to be displayed, e.g. the brightness around the vehicle. Thus, it is possible to considerably improve the display on the display unit 30, as the overlay portion characteristic is adjusted and optimized with regard to the actual image, i.e. the image characteristic.

Figure 5:
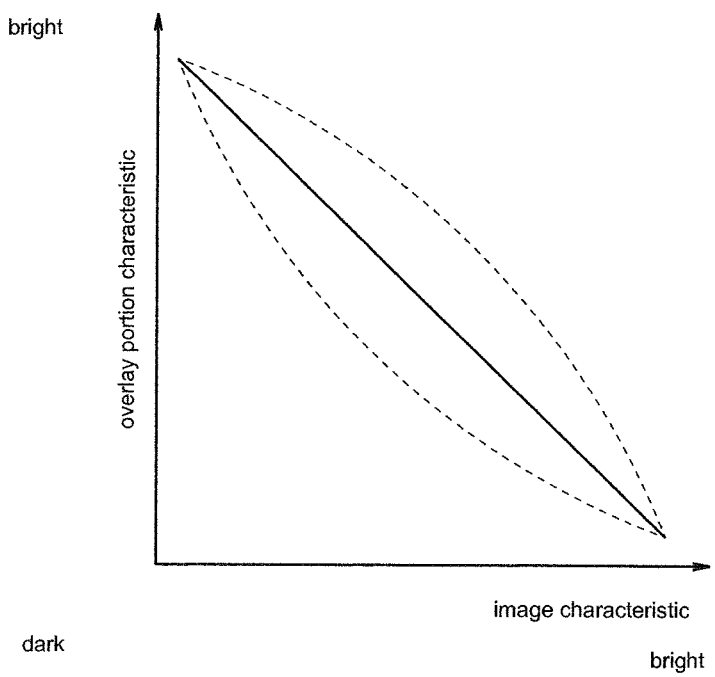
FIG. 5 is a first example of a mathematical relationship between an image characteristic measured in a measuring portion and the determined overlay portion characteristic.

Ideally, the determination of the overlay portion characteristic is carried out dependent on a mathematically allocated image characteristic. Here, it is not necessary, although it is possible, that the image characteristic is the same as the overlay portion characteristic to be determined:

FIG. 5, for example, shows a first mathematical function illustrating the overlay portion characteristic "brightness" dependent on the image characteristic "brightness". This means that, here, the same image characteristic and overlay portion characteristic is used. This means that, in case of a mathematical allocation as shown in FIG. 5, the brightness of the image portion 1, 1a, 1b, 1c, 1d is acquired in the measuring portion 3, 3a, 3b, 3c, 3d, and evaluated in the calculation unit 20. Dependent on this evaluation, the overlay portion characteristic "brightness" is then determined for the overlay portion 2, 4, 5 in the calculation unit 20. As can be seen from FIG. 5, the function may, for example, be a linear function (continuous line in FIG. 5), so that a bright image in the measuring portion 3, 3a, 3b, 3c, 3d, is allocated with a dark overlay portion, and a dark image portion in the measuring portion 3, 3a, 3b, 3c, 3d is allocated with a bright overlay portion 2, 4, 5. The function as shown in FIG. 5 may be linear (continuous line in FIG. 5) or non-linear (dashed lines in FIG. 5), or any other function as long as it allows for a clear allocation of at least one image characteristic acquired in the measuring portion with at least one overlay portion characteristic. Of course, it is also possible to modify, dependent on a specific image characteristic like, for example, brightness, contrast, saturation, or color shade, a specific corresponding overlay portion characteristic (one to one allocation, if necessary repeatedly), wherein, for example, at the same time the brightness dependent on the brightness of the image portion 1, 1a, 1b, 1c, 1d and the saturation dependent on the saturation of the image portion 1, 1a, 1b, 1c, 1d may be changed/modified.

Figure 6:
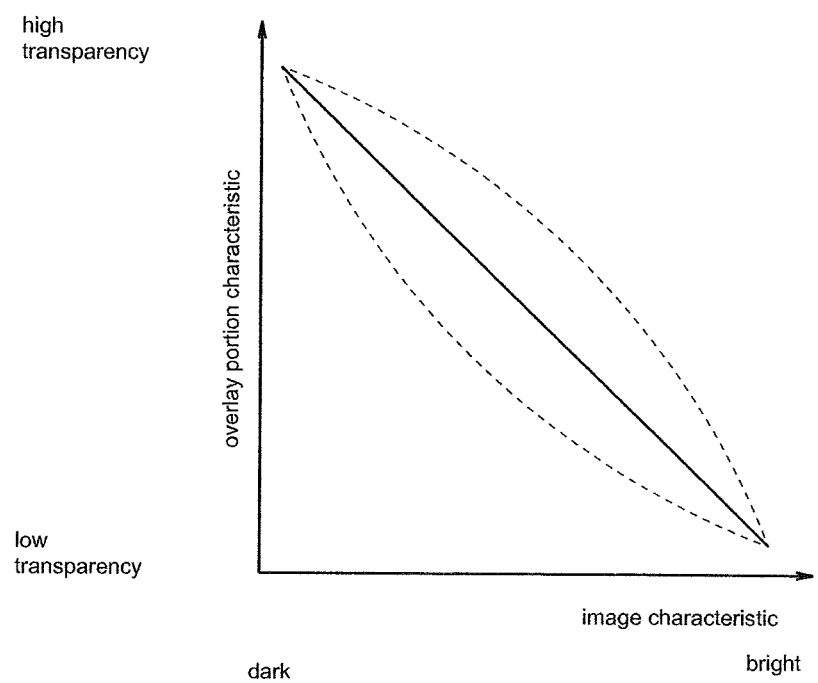
FIG. 6 is a second example of a mathematical relationship between an image characteristic measured in a measuring portion and the overlay portion characteristic.

Alternatively or additionally, it is also possible to allocate a specific image characteristic, e.g. brightness, with another overlay portion characteristic, e.g. transparency. This is shown in FIG. 6. Here, when the image captured in the measuring portion 3, 3a, 3b, 3c is bright, a low transparency of the overlay portion 2, 4, 5 is provided, and when the image captured in the measuring portion 3, 3a, 3b, 3c, 3d is dark, a high transparency of the overlay portion 2, 4, 5 is provided.

Here, arbitrary reasonable combinations of the image characteristic and the overlay portion characteristic and corresponding mathematical allocations are possible. As already mentioned, it is also possible to modify a plurality of characteristics of the overlay portion 2, 4, 5 dependent on one or several image characteristics in the measuring portion 3, 3a, 3b, 3c, 3d.

In case that a plurality of measuring portions 3a, 3b, 3c, 3d are provided adjacent to a common overlay portion 4, as shown in FIGS. 2 and 3, preferably, an image characteristic is determined for each of the measuring portions 3a, 3b, 3c, 3d, and then, an evaluation is carried out in the calculation unit 20, which determines an optimized and/or averaged overlay portion characteristic based on the entirety of captured image characteristics.

According to a preferred embodiment, the modification of the characteristics of the overlay portion 2, 4, 5 is time-delayed with regard to the modification of the characteristics of the image portion 1, 1a, 1b, 1c. Preferably, the overlay portion characteristic of overlay portion 2, 4, 5 is only correspondingly adapted in case of a continued presence of a specific characteristic of the image portion 1, 1a, 1b, 1c, 1c in the measuring portion 3, 3a, 3b, 3c, 3d. This avoids that, in case of a short, temporary change of the image characteristic in the measuring portion 3, 3a, 3b, 3c, 3d, a change of the overlay portion characteristic is carried out in the overlay portion 2, 4, 5, which change is perceived as a flickering.

Thus, by means of the display system for a vehicle, a clear distinction between different image portions can be ensured independent of the current image characteristics. Separating portions or superimposition portions are recognizable independent of the current image content, as it is prevented that the image portion and the overlay portion take on the same characteristics. It is further possible to immediately recognize a defective display unit as, for example, a defective monitor may be distinguished from a black image content at night. Although the image content is always visible due to a clear difference in contrast between image and overlay portion, the driver is not disturbed, for example, by a too brightly displayed overlay at night.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A display system for a vehicle, comprising:
an image capturing unit for capturing image data of the vehicle environment;
a calculation unit, and
a display unit for displaying an image to be displayed, the image to be displayed having at least one image portion, the at least one image portion being displayed on the display unit;
wherein the calculation unit is adapted to carry out a modification of the image data captured by the image capturing unit and to supply the modified image data to the display unit for display,
wherein the modification includes overlaying or superimposing an overlay portion for display by the display unit on at least a portion of the image to be displayed on the display unit, the overlay portion being displayed on the display unit so that the overlay portion is displayed at a location on the display unit within or directly adjacent to a display location of the at least one image portion,
wherein each of the at least one image portion, has a sub-region adjacent to the overlay portion of the respective at least one image portion and which forms a measuring portion at which an image characteristic of the at least one image portion that is displayed on the display unit is acquired, the image characteristic being calculated by the calculation unit based on an analysis of a portion of the image data: (a) captured by the image capturing unit to form the image displayed on the display unit, and (b) corresponding to the measurement portion of the displayed at least one image portion, and wherein the calculation unit is adapted to change an overlay portion characteristic based on a result of the analysis of the image data by the calculation unit, the changed overlay portion characteristic including at least one selected from the group of: color shade, brightness, contrast, saturation and transparency, and wherein the calculation unit is adapted to determine the overlay portion characteristic time-delayed with regard to the acquisition of the image characteristic of the at least one image portion, if a certain characteristic of the at least one image portion is present for a certain period of time.

2. The display system according to claim 1, wherein the at least one image portion comprises a plurality of image portions and wherein the overlay portion comprises a separating portion between plural image portions and/or a frame around one image portion.

3. The display system according to claim 2, wherein the overlay portion comprises a superimposition portion which entirely or at least partly overlaps the at least one image portion.

4. The display system according to claim 2, wherein the measuring portion is within or directly adjacent to the overlay portion in the at least one image portion.

5. The display system according to claim 2, wherein the calculation unit is provided in the image capturing unit and/or in the display unit.

6. The display system according to claim 2, wherein a processing unit (ECU) is provided, and wherein the calculation unit is, at least partly, provided in the processing unit (ECU).

7. The display system according to claim 2, wherein the calculation unit is adapted to map the image characteristic of the at least one image portion to the overlay portion characteristic by a mathematical function.

8. The display system according to claim 1, wherein the overlay portion comprises a superimposition portion which entirely or at least partly overlaps the at least one image portion.

9. The display system according to claim 1, wherein the measuring portion is within or directly adjacent to the overlay portion in the at least one image portion.

10. The display system according to claim 1, wherein the acquired image portion characteristic is a characteristic regarding color shade, brightness, contrast and saturation, or a combination of these characteristics.

11. The display system according to claim 1, wherein the calculation unit is provided in the image capturing unit and/or in the display unit.

12. The display system according to claim 1, wherein a processing unit (ECU) is provided, and wherein the calculation unit is, at least partly, provided in the processing unit (ECU).

13. The display system according to claim 12, wherein size and/or position and/or type of the overlay portion are changed dependent on current vehicle driving parameters.

14. The display system according to claim 13, wherein at least two image portions are provided, which image portions are horizontally and/or vertically separated from each other by the overlay portion.

15. The display system according to claim 12, wherein at least two image portions are provided, which image portions are horizontally and/or vertically separated from each other by the overlay portion.

16. The display system according to claim 1, wherein at least two image portions are provided, which image portions are horizontally and/or vertically separated from each other by the overlay portion.

17. The display system according to claim 1, wherein the calculation unit is adapted to map the image characteristic of the at least one image portion to the overlay portion characteristic by a mathematical function.

* * * * *